United States Patent
Furuichi et al.

(10) Patent No.: US 10,097,999 B2
(45) Date of Patent: Oct. 9, 2018

(54) SATISFYING VIRTUAL MACHINE SECURITY CRITERIA USING REMOTE SENSOR DEVICES

(71) Applicant: International Business Machines Corporation, Armonk, NY (US)

(72) Inventors: Sanehiro Furuichi, Tokyo (JP); Masami Tada, Sagamihara (JP); Takahito Tashiro, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 14/960,467

(22) Filed: Dec. 7, 2015

(65) Prior Publication Data

US 2017/0164198 A1 Jun. 8, 2017

(51) Int. Cl.
| | |
|---|---|
| *G06F 15/16* | (2006.01) |
| *H04W 12/08* | (2009.01) |
| *H04W 4/00* | (2018.01) |
| *H04W 4/02* | (2018.01) |
| *H04L 29/06* | (2006.01) |
| *H04W 4/70* | (2018.01) |

(52) U.S. Cl.
CPC ............ *H04W 12/08* (2013.01); *H04L 67/42* (2013.01); *H04W 4/005* (2013.01); *H04W 4/025* (2013.01); *H04W 4/70* (2018.02)

(58) Field of Classification Search
CPC ....... H04W 12/08; H04W 4/70; H04W 4/025; H04L 67/42
See application file for complete search history.

(56) References Cited

U.S. PATENT DOCUMENTS

| | | |
|---|---|---|
| 7,954,150 B2 | 5/2011 | Croft et al. |
| 2013/0007465 A1 | 1/2013 | Movassaghi |
| 2013/0318521 A1* | 11/2013 | Monaghan ............ H04L 63/107 718/1 |
| 2014/0047114 A1 | 2/2014 | Chokshi et al. |
| 2015/0106529 A1 | 4/2015 | Kang et al. |
| 2015/0200928 A1 | 7/2015 | Burch et al. |
| 2015/0229643 A1 | 8/2015 | Kiriyama et al. |

OTHER PUBLICATIONS

Citrix, "Securing virtual desktop infrastructure with Citrix NetScaler," White Paper, 8 pages, © 2013 Citrix Systems, Inc.
Lin et al., "A Dynamic Network Access Control Mechanism for Virtual Desktop Environment," 2013 15th Asia-Pacific Network Operations and Management Symposium, Sep. 25-27, 2013, 3 pages, Copyright 2013 IEICE.
Furuichi et al., "Configuration Management for Virtual Machine Environment," U.S. Appl. No. 14/736,422, filed Jun. 11, 2015.

* cited by examiner

*Primary Examiner* — Padma Mundur
(74) *Attorney, Agent, or Firm* — Christopher M. Coy

(57) ABSTRACT

A virtual machine (VM) server may be used to enforce a set of security criteria upon a remote client device. The VM server may be configured to host a VM that has features that can be utilized by a user at the remote client device. The VM server may receive sensor data collected by one or more sensors of a remote sensor device. The VM server may identify that the sensor data satisfies at least a portion of the set of security criteria. The VM server may further identify that the remote client device is within a predetermined proximity of the remote sensor device. The VM server may further enable a user at the remote client device to utilize the features of the VM hosted on the VM server.

17 Claims, 10 Drawing Sheets

SATISFYING VIRTUAL MACHINE SECURITY CRITERIA USING REMOTE SENSOR DEVICES

BACKGROUND

The present disclosure relates generally to the field of multi-computer data transferring, and, more particularly, to controlling network resource access.

A virtual machine (VM) may be an emulation of a particular computer system. The emulation may be displayed on a remote client device and hosted on VM server. A user may be able to utilize various features of the computer system via the remote client device. In some situations, the VM may be an operating system installed on software that imitates hardware (e.g., a hypervisor). One or more VMs may be hosted by a single VM server. Each of the one or more VMs may be utilized by one or more remote client devices.

SUMMARY

Aspects of the present disclosure include a method, a system, and a computer program product. In some embodiments, the method, system, and computer program product may use a virtual machine server to enforce a set of security criteria upon a remote client device. The virtual machine server may be configured to host a virtual machine that has features that are utilizable by a user at the remote client device. The method, system, and computer program product may further receive, by the virtual machine server, sensor data collected by one or more sensors of a remote sensor device. The method, system, and computer program product may further identify, by the virtual machine server, that the sensor data satisfies at least a portion of the set of security criteria. The method, system, and computer program product may further identify, by the virtual machine server, that the remote client device is within a predetermined proximity of the remote sensor device. The method, system, and computer program product may further enable, by the virtual machine server, a user at the remote client device to utilize the features of the virtual machine hosted on the virtual machine server based on the sensor data satisfying the at least a portion of the set of security criteria and further based on the remote client device being within the predetermined proximity of the remote sensor device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
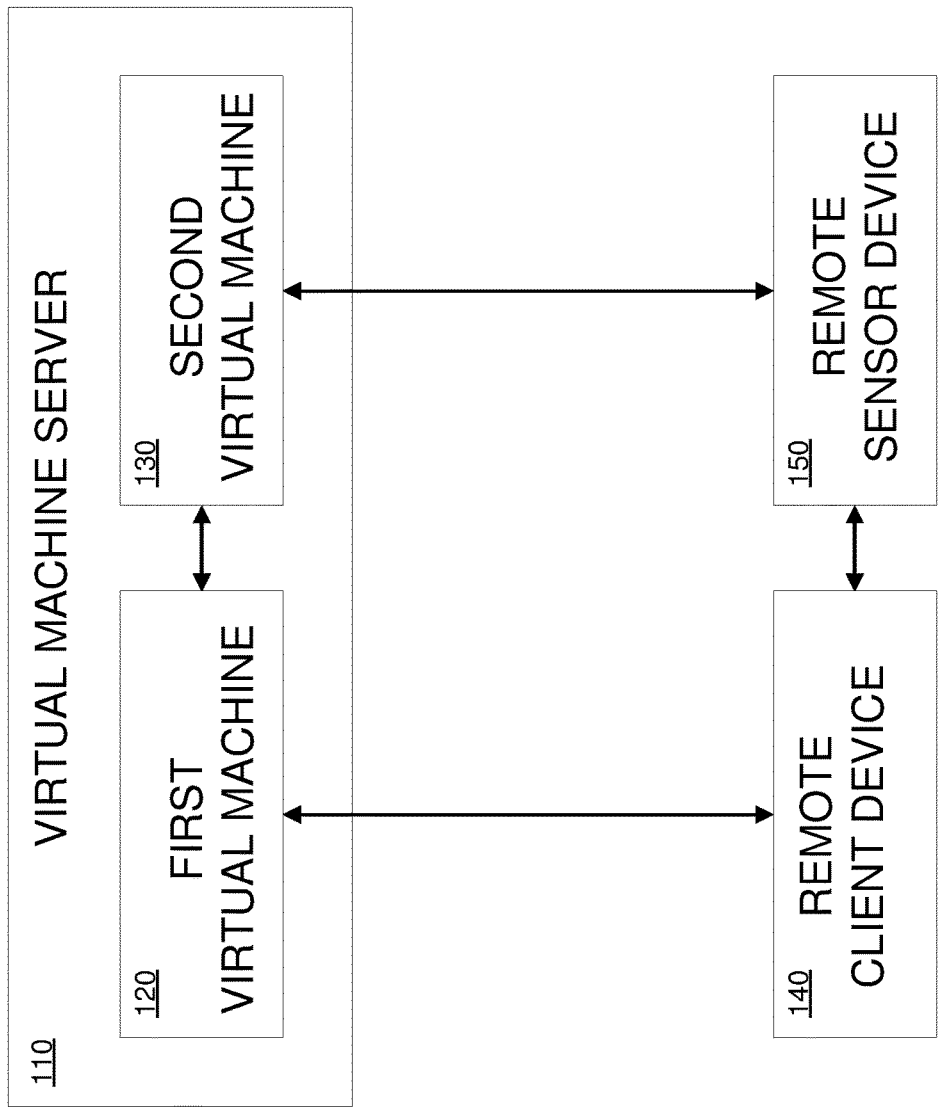
FIG. 1 illustrates a block diagram of an example of a remote client device gaining access to a first virtual machine (VM) hosted on a VM server by using a remote sensor device that has access to a second VM hosted on the VM server, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to multi-computer data transferring, and, more particularly, to controlling network resource access. While the present disclosure is not necessarily limited to such applications, various aspects of the disclosure may be appreciated through a discussion of various examples using this context.

With an advancement of virtual technology, as well as enhancement of communication environments, organizations may be able to entirely transform their operating environments from on-site locations to virtual machine (VM) servers. These transformation may allow employees to work remotely, e.g., at home and outside of an on-site location, by utilizing VMs that are hosted on a VM server. In addition to the advancement of virtual technology, a recent spread of remote client devices, including smart phones and tablets, has made VM servers more readily accessible remotely. However, such remote access can bring potential security risks that can depend on the configuration of the remote client device, as well as other factors. In order to reduce the potential security risks, required mechanisms and other security criteria for accessing the VM server can be implemented.

In some embodiments, in situations where a remote client device cannot satisfy a set of security criteria directly, these criteria may be satisfied by dynamically connecting to the remote client device to a remote sensor. The remote sensor device may be a second remote client device that does not include the potential security risks presented by the first remote client device or that otherwise has capabilities necessary to satisfy the security requirements for the first remote client device to the satisfaction of the VM server. The second remote client device may also include sensors that collect data from the environment nearby the both of the remote client devices in situations where the remote client devices are in close proximity to each other. Information about the nearby environment, such as geographic location and digital images of surrounding people or objects, could reduce the likelihood that features of a VM being displayed on the first remote client device will be utilized by unauthorized users.

In some embodiments, the second remote client device may itself be currently utilizing a VM hosted on the VM server. In other embodiments, the second remote client device may be configured as a dedicated remote sensor device that is used for sending sensor data, e.g., environmental information, to the VM server for verification. This may involve the sensor data being collected from sensors of the second remote client device, and the second remote client device then sharing this sensor data with the VM server. The first remote client device may be allowed to utilize features of a VM hosted on the VM server once the VM server verifies this sensor data.

In some embodiments, context-aware control may be required by a VM server for one or more remote client devices attempting to utilize features of a VM hosted on the VM server. This may involve a remote client device needing to satisfy connection requirements, hardware and software configuration requirements, and other security requirements relating to the external environment in which the remote client device is located. In some embodiments, in order to satisfy these requirements, the remote client devices may generally need to be equipped with sensors for detecting the nearby environment, as well as being equipped with other hardware and software that satisfy other general security requirements (e.g., a minimum required version of an operating system, having an available data encryption feature).

For example, in some embodiments, a set of security criteria could be dynamically implemented by detecting where a remote client device (e.g., a mobile device) is located by using GPS or Wi-Fi access point information; detecting how the remote client device is carried by using acceleration and gyroscopic sensors (e.g., to ensure that the device is not being carried in unsafe manner); and detecting information about the situation around the remote client device by using an embedded camera or illuminance sensors. In some situations, the remote client device may have physically attached sensors (e.g., internal sensors, embedded sensors) that are capable of detecting this information and, in some embodiments, transmitting this information to a virtual machine server. However, in some situations a particular remote client device may not include the necessary sensors. In such situations, that particular remote client device may not be able to access features of a VM hosted the VM server because even if it does technically satisfy the set of security criteria, it still is not capable of providing the necessary sensor data to the VM server to prove that it satisfies the set of security criteria.

Now turning to FIG. 1, shown is a block diagram of an example of a remote client device 140 gaining access to a first VM 120 hosted on a VM server 110 by using a remote sensor device 150 that has access to a second VM 130 hosted on the VM server 110, according to various embodiments. In some embodiments, the remote client device 140 may be an electronic client device, e.g., a smart phone, computer tablet, desktop, laptop, or other computing device. Furthermore in some embodiments, each of the VM server 110, the remote client device 140, and the remote sensor device 150 may be a computer system such as the computer system 1012 shown in FIG. 10.

In some embodiments, the remote client device 140 (or a user thereon) may have been denied access to utilize one or more features of the first VM 120 due to not satisfying at least a portion of a set of security criteria. For example, the remote client device 140 may be allowed, while not satisfying the set of security criteria, to view a graphical interface of the first VM 120, but may not be allowed to interact with icons on the graphical interface. In some embodiments, the first VM 120 may be hosted on the VM server 110 along with the second VM 130. In some embodiments, the first VM 120 and/or the second VM 130 may be a virtual desktop. In some embodiments, even while not having access to all of the features of the first VM 120, the remote client device 140 may still be communicatively coupled or in connection with the first VM server 110 (and potentially the first VM 120) without the being able to utilize the first VM's 120 features.

In some embodiments, the set of security criteria may include connection or security requirements, e.g., required operating system, encryption capabilities/features, and hardware. The set of security criteria may also include one or more sensors that can collect sensor data. The sensor data may include an electrical representation of the internal state of the remote client device 140 in the form of data, as well as an electrical representation of the external state of the remote client device 140 in the form of data. For example, the external state of the remote client device 140 may be the environment in which the remote client device 140 is operating. More specifically, the environment may include, for example, the temperature, altitude, geographic location, and digital images of the current operating location surrounding the remote client device 140.

In some embodiments, the one or more sensors on the remote client device 140 and/or the remote sensor device 150 may include, for example, biometric sensors configured to collect biometric data of a user of the remote client device 140. The biometric data may be used for authentication of a user. The authentication may increase the likelihood that an acceptable user is operating the remote client device 140. The biometric data may include, for example, characteristics of the user, such as finger print data, facial recognition data, DNA data, palm print data, hand geometry data, iris recognition data, retina data, typing rhythm data, gait data, and voice data. In some embodiments, the one or more sensors may further include a camera, accelerometer, gyrometer, barometer, GPS system, or other sensor instrument configured to collect various types of sensor data.

In some embodiments, the remote sensor device 150 may be an electronic device, e.g., a smart phone, computer tablet, desktop, laptop, or other computing device. In some embodiments, in order for the remote client device 140 to utilize the remote sensor device 150 to satisfy some or all of the set of security criteria, the remote sensor device 150 may need to be within a predetermined proximity of the remote client device 140. In some embodiments, the remote sensor device 150 could be within the predetermined proximity when it is, e.g., in the same room, within twenty feet, or within a same operating facility as the remote client device 140.

In some embodiments, the remote sensor device 150 may be used to satisfy a portion of the set of security criteria for the remote client device 140. For example, the remote sensor device 150 may include a camera and a GPS. In some embodiments, the remote client device 140 may identify the remote sensor device 150 as being within the predetermined proximity in response to being denied access to the first VM 120 by the VM server 110. The remote client device 140 may also determine that the remote sensor device 150 includes the necessary connection and sensors need to allow the remote client device 140 to satisfy the security requirements. The remote client device 140 may then electronically connect with the remote sensor device 150. The remote sensor device 150 may be communicatively coupled to both the second VM 130 hosted on the VM server 110 and the remote client device 140. In some embodiments, the remote sensor device 150 may connect to the second VM 130 either prior to or in response to becoming connected to the remote client device 140.

In some embodiments, the remote sensor device 150 may collect sensor data via the one or more of its sensors, and then electronically transmit the sensor data to the second VM 130 for verification by the VM server 110. Verification may occur by the sensor data exceeding a threshold. The threshold may be predetermined so that it meets a minimum requirement of security and so that it satisfies at least a portion of the set of security criteria for either remote client device 140 or for the remote sensor device 150 itself. In some embodiments, verification may also occur by and within the remote sensor device 150. For example, the remote sensor device 150 may have previously received instructions from the VM server 110 and the remote sensor device 150 may be configured to verify that sensor data collected by its sensors satisfies the security criteria that the VM server places on the remote client device 140.

In some embodiments where the verification is achieved within the remote sensor device 150, the remote sensor device 150 may transmit an encrypted verification through the remote client device 140 to the first VM 120 that confirms whether or not the remote client device 140 meets the set of security criteria. In some embodiments, the encrypted verification cannot be decrypted by the remote client device 150 but can be decrypted by the first VM 120 and the VM server 110. In some embodiments where verification is performed by the second VM 130, once the sensor data is verified, the second VM 130 may transmit an electrical signal to the first VM 120 that includes the verification that the remote client device 140 should be allowed access. Once the first VM 120 and/or other component of the VM server 110 receives the verification, the remote client device 140 may be enabled to begin utilizing features of the first VM 120.

In some embodiments, the remote sensor device 150 may collaborate closely with one or more remote client devices in addition to the remote client device 140. In such embodiments, the remote sensor device 150 may help each of the remote client devices that does not, on its own, satisfy at least a portion of the set of security requirements. In some embodiments, a pseudo VM which may not provide any functionalities for utilization by a user at the remote device 150 may be used in place of the second VM 130. This pseudo VM may be a simplified component that is used primarily or solely to collect sensor data on behalf of the VM server 110. The pseudo VM may be utilized in order to reduce wasting computing resources, especially when the remote sensor device 150 is not utilizing or configured to utilize features of the second VM 130.

In some embodiments, the sensor device data may be received via a first connection between the remote sensor device 150 and the VM server 110. The first VM 120 may be provided to the remote client device 140 via a second connection between the remote client device 140 and the VM server 110. In some embodiments, the data transmitted over the first connection may not be accessible by the remote client device 140 and the data transmitted over the second connection may not be accessible the remote sensor device 150. The remote sensor device and the remote client device, while within a predetermined proximity of each other, may not be physically connected. In some embodiments separating connections as described herein may enable the server to increase security of data transmissions.

In some embodiments, the remote sensor device 150 may be a second remote client device that is used by a second user. This second user may use the sensor data collected by the second remote client device to satisfy the set of security criteria. This may allow the second user to utilize features of the second virtual machine 130.

Figure 2:
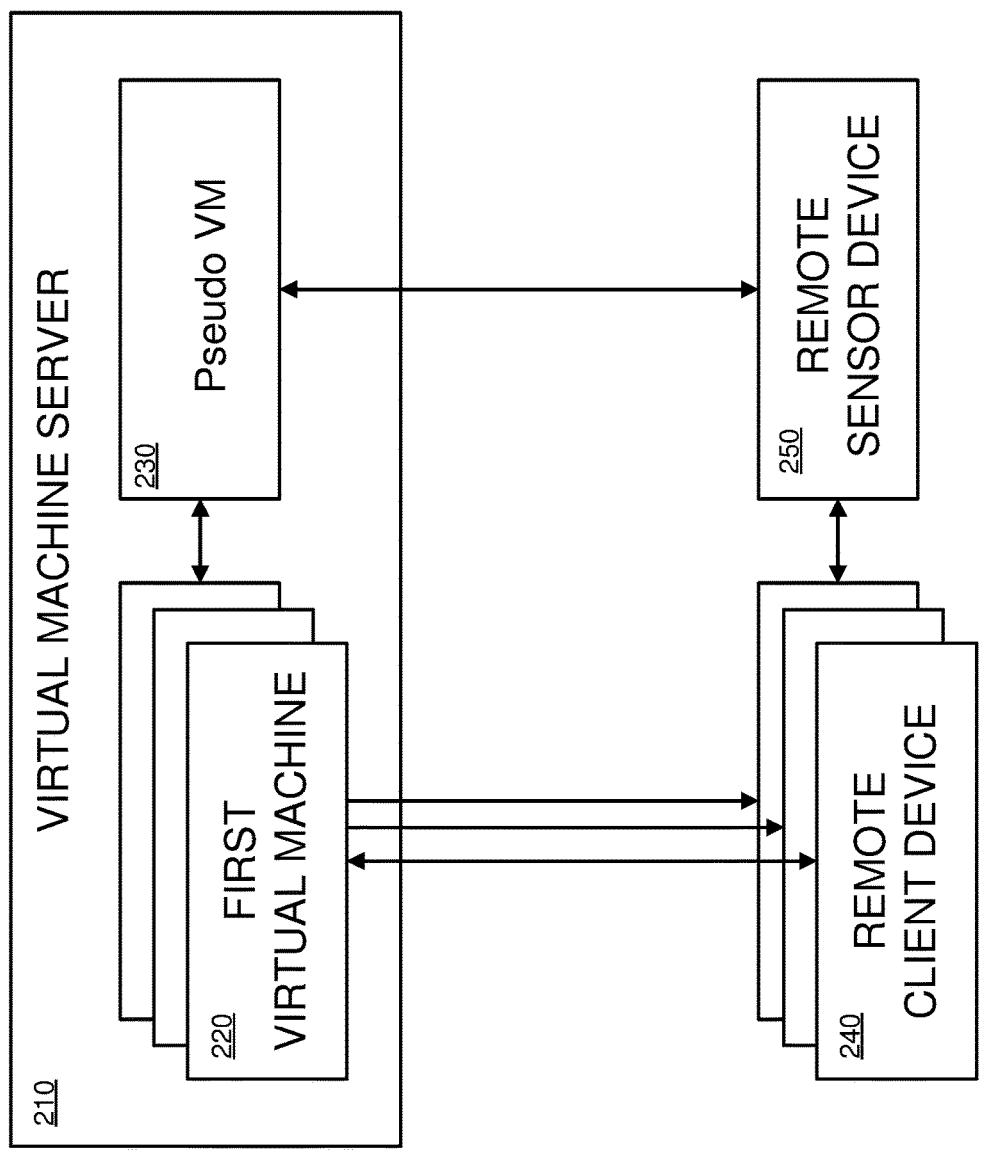
FIG. 2 illustrates a block diagram of an example of a remote client device of a plurality of remote client devices that each gain access to a VM hosted on a VM server by using a remote sensor device that has access to a pseudo VM hosted on the VM server, according to various embodiments.

Now turning to FIG. 2, shown is a block diagram of an example of a remote client device 240 of a plurality of remote client devices that each gain access virtual machines on a VM server 210 by using a remote sensor device 250 that has access to a pseudo VM 230 hosted on the VM server 210, according to various embodiments. In some embodiments, the plurality of remote client devices can be electronic devices, e.g., smart phones, computer tablets, desktops, laptops, or other computing devices. Each remote client device may be different from the other remote client devices.

In some embodiments, the plurality of remote client devices may have been denied access to utilize one or more features of one or more VMs including the first VM 220 hosted on the VM server 210. In some embodiments, each of the plurality of remote client devices may still be communicatively coupled or in connection with the one or more VMs without being able to utilize their one or more features. In some embodiments, the plurality of remote client devices may each not include one or more connection requirements and/or be able to meet one or more security requirements. In some embodiments, the plurality of client devices may each identify a remote sensor device, e.g., remote sensor device 250.

In some embodiments, the remote sensor device 250 may include at least the connection and security requirements that the plurality of remote client devices are lacking. In some embodiments, the remote sensor device 250 may be an electronic device, e.g., a smart phone, computer tablet, desktop, laptop, or other computing device. The remote sensor device 250 may be within a predetermined proximity of each of the plurality of remote client devices, e.g., in the same room or within a same operating facility as each of the plurality of remote client devices. The predetermined proximity may vary among the remote client devices depending on proximity requirements established by the VM server 210. In some embodiments, the remote sensor device 250 may collect sensor data about each of the plurality of client devices' internal and external states. In some embodiments, the remote sensor device 250 may be able to verify the sensor data and then send an encrypted verification to each of the one or more VMs through the plurality of remote client devices. The encrypted verification may not be subject to decryption by the plurality of remote client devices. The encrypted verification may be subject to decryption by the one or more VMs.

In some embodiments, the remote sensor device 250 may transmit the sensor data electronically to the pseudo VM 230. In some embodiments, the pseudo VM 230 may be configured to verify the sensor data. When the pseudo VM 230 verifies the sensor data, the pseudo VM 230 may then transmit the verification to each of the one or more VMs. The one or more VMs may then grant the plurality of remote client devices access to utilize their respective features.

Figure 3:
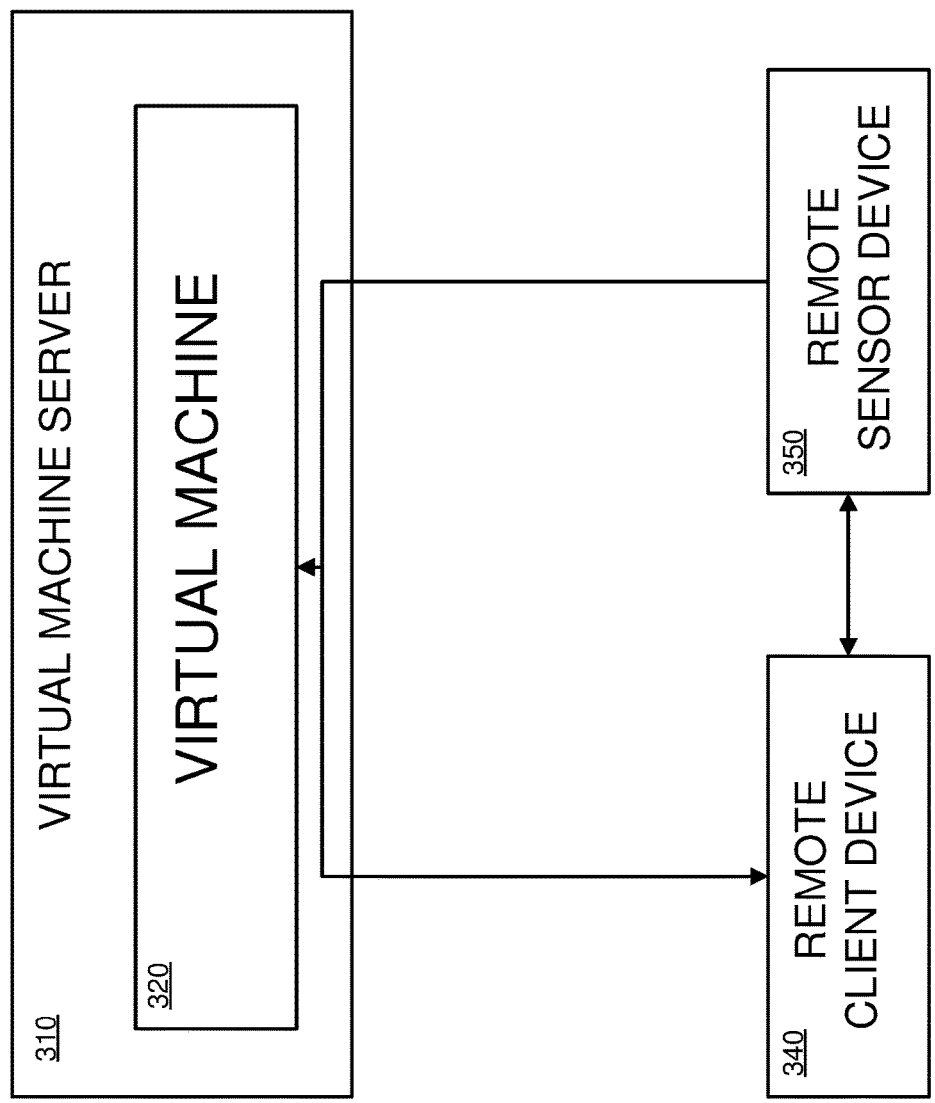
FIG. 3 illustrates a block diagram of an example of a remote client device and a remote sensor device sharing a same VM instance hosted on a VM server, according to various embodiments.

In some embodiments, both a remote client device and a remote sensor device may connect to a same VM. In some embodiments, the VM may be partitioned so that a first portion includes features to be utilized by the remote client device while a second portion receives sensor data from the remote sensor device. Now turning to FIG. 3, shown is a block diagram of an example of a remote client device 340 and a remote sensor device 350 sharing a same VM instance 320 hosted on a VM server 310, according to various embodiments. In some embodiments, the remote client device 340 may be substantially similar to the remote client device 140 of FIG. 1. In some embodiments, the remote sensor device 350 may be substantially similar to the remote sensor device 150 of FIG. 1.

In some embodiments, the remote client device 350 may have been denied access to one or more features of the virtual machine 320. One or more sensors of the remote sensor device 350 have then be used to collect sensor data that includes information pertaining to the internal and external state of the remote client device 340. In some embodiments, the remote client device 350 can verify the sensor data. The remote sensor device 350 may then send the verification in the form of an encrypted electronic signal to the VM 320. The VM 320 may then grant access to the remote client device 340 in order for the remote client device to utilize one or more features of the VM 320.

In some embodiments, the VM 320 can verify the sensor data sent by the remote sensor device 350. The VM 320 may then grant the remote client device 340 access to utilize the one or more features of the VM 320. In some cases, the remote sensor device 350 may be a dedicated sensor devices such as a surveillance camera or a Wi-Fi access point that can be used to send the sensor data to the VM 320.

Figure 4:
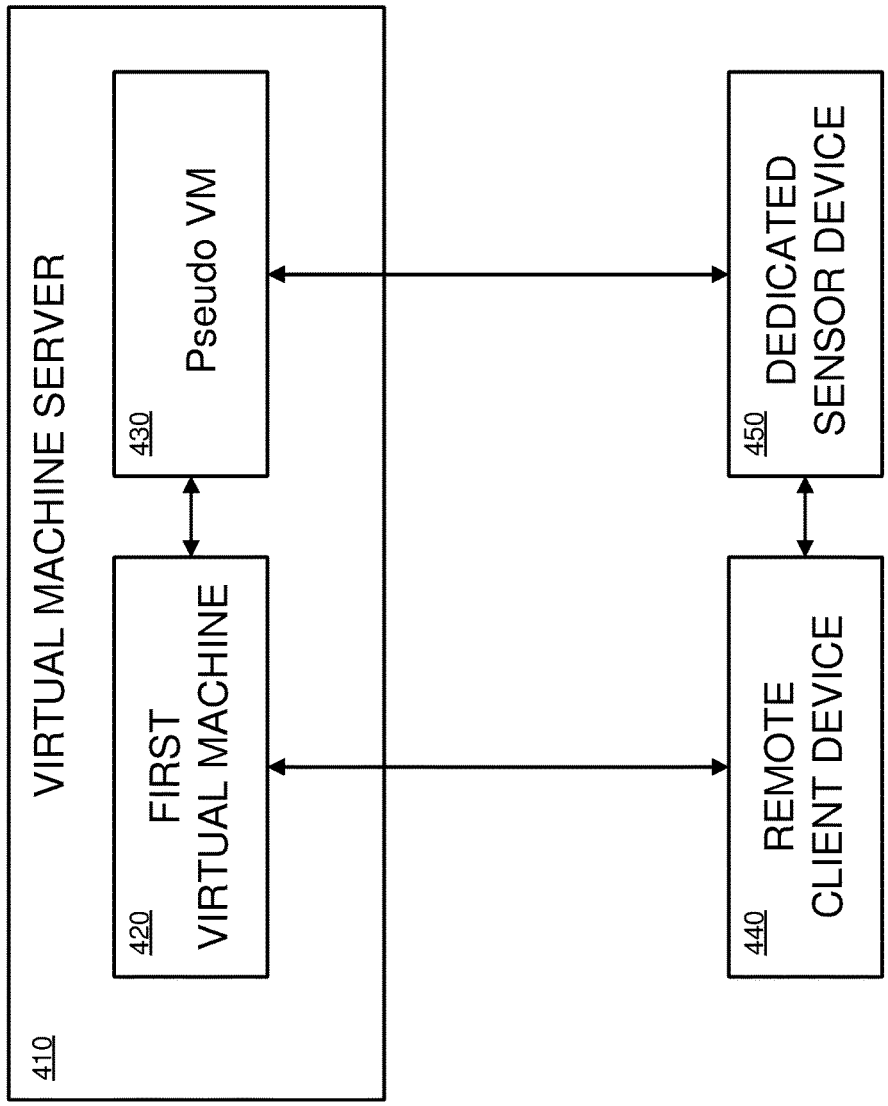
FIG. 4 illustrates a block diagram of an example of a remote client device attempting to gain access to a first VM hosted on a VM server using a dedicated sensor device that has access to a pseudo VM hosted on the VM server, according to various embodiments.

In some embodiments, a remote sensor device, may be a dedicated sensor device. The dedicated sensor device may be configured to collect sensor data, encrypt the sensor data, and transmit the sensor data to a VM server and/or to a remote client device on whose behalf the dedicated sensor device is acting. Now turning to FIG. 4, shown is a block diagram of an example of a remote client device 440 attempting to gain access to a first VM 420 hosted on a VM server 410 using a dedicated sensor device 450 that has access to a pseudo VM 430 hosted on the VM server 410, according to various embodiments. In some embodiments, the remote client device 440 may be substantially similar to the remote client device 140 of FIG. 1. In some embodiments, the dedicated sensor device 450 may be, e.g., a GPS, accelerometer, camera, or a combination thereof.

In some embodiments, the remote client device 440 may identify the dedicated sensor device 450 in response to being denied access to the first VM 420 that is hosted by the VM server 410. The remote client device 440 may also determine that the dedicated sensor device 450 includes the necessary connection and security requirements. In some embodiments, the remote client device 440 may electronically connect with the dedicated sensor device 450. In some embodiments, the dedicated sensor device 450 may be communicatively coupled to a pseudo VM 430 hosted by the VM server 410. In some embodiments, the dedicated sensor device 450 may connect to the pseudo VM 430 either prior to or in response to becoming connected to the remote client device 440.

In some embodiments, the dedicated sensor device 450 may collect sensor data, then electronically transmit the sensor data to the pseudo VM 430 for verification. Verification may occur when the sensor data exceeds a threshold. The threshold may be predetermined so that it meets a minimum requirement of security or so that it satisfies at least a portion of a set of security criteria. Verification may also occur by and within the dedicated sensor device 450. In some embodiments where the verification is achieved within the dedicated sensor device 450, the dedicated sensor device 450 may transmit an encrypted verification through the remote client device 440 to the first VM 420. In some embodiments, the encrypted verification cannot be decrypted by the remote client device 440, but can be decrypted by the first VM 420.

In some embodiments, once the sensor data is verified, the pseudo VM 430 may transmit an electrical signal to the first VM 420 that includes an approval for the remote client device 440 to gain access. Once the first VM 420 receives the approval, the remote client device 440 may be enabled to begin utilizing features of the first VM 420.

Figure 5:
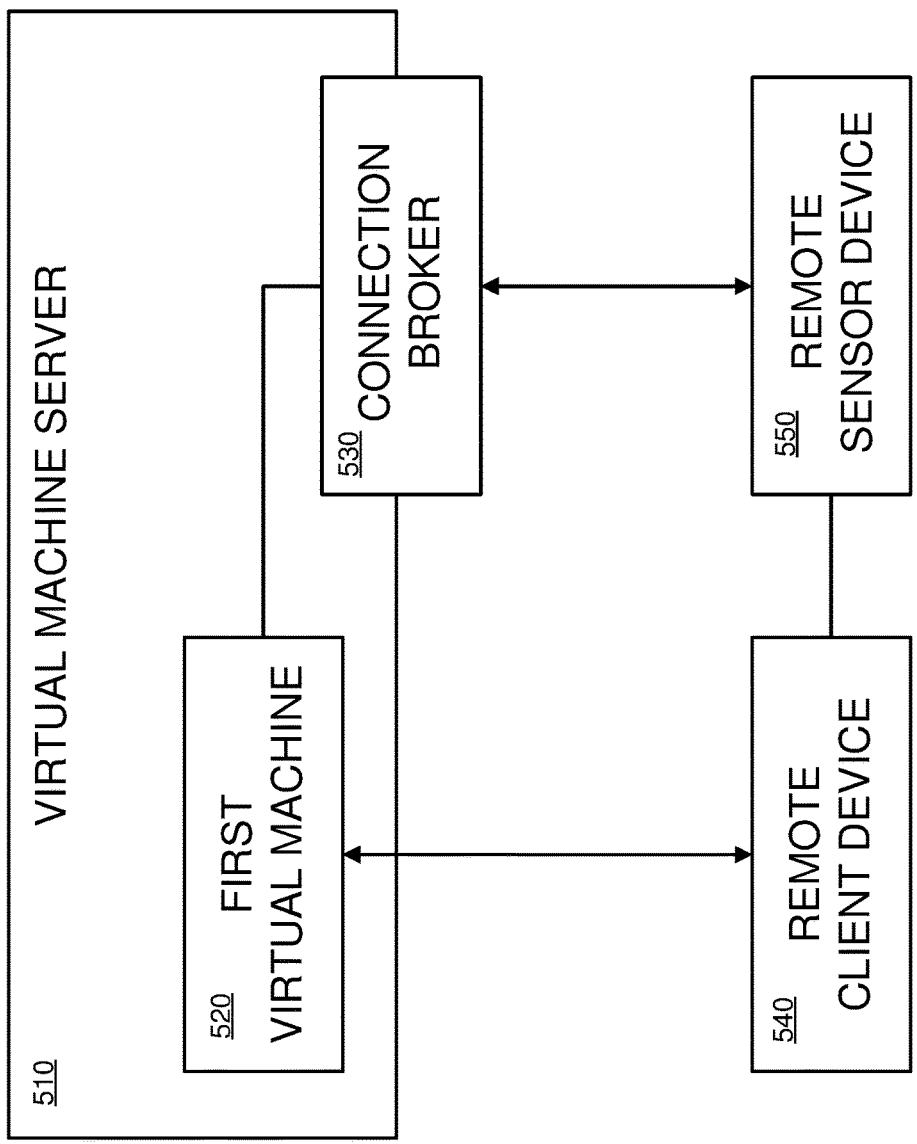
FIG. 5 illustrates a block diagram of an example of a remote client device attempting to gain access to a first VM hosted on a VM server using a remote sensor device that is connected to the VM server through a connection broker, according to various embodiments.

In some embodiments, instead of establishing a pseudo desktop session (e.g., or other pseudo VM) for a remote sensor device, it may also be possible to establish a specific-purpose communication channel between the remote sensor device and a VM server, e.g., a connection broker, which manages VM connections between remote client devices and the VM server and/or manages connections between remote sensor devices and the VM server. Now turning to FIG. 5, shown is a block diagram of an example of a remote client device 540 attempting to gain access to a first VM 520 hosted on a VM server 510 using a remote sensor device 550 that is connected to the VM server 510 through a connection broker 530, according to various embodiments. In some embodiments, the remote client device 540 and the remote sensor device 550 can be substantially similar to the remote client device 140 and the remote sensor device 150 of FIG. 1, respectively.

In some embodiments, a connection broker 530 can be communicatively coupled to the remote sensor device 550. The connection broker 530 may be a resource manager that manages one or more connections from the remote sensor device 550. The connection broker 530 may be configured to receive sensor data transmitted by the remote sensor device 550. The connection broker 530 may include a decryption feature that decrypts encrypted sensor data transmitted by the remote sensor device 550. In some embodiments, the sensor data may be verified by the connection broker 530, then the connection broker 530 may send the verification to the first VM 520. In some embodiments, the first VM 520 may then grant the remote client device 540 access to utilize one or more features of the first VM 520.

Figure 6:
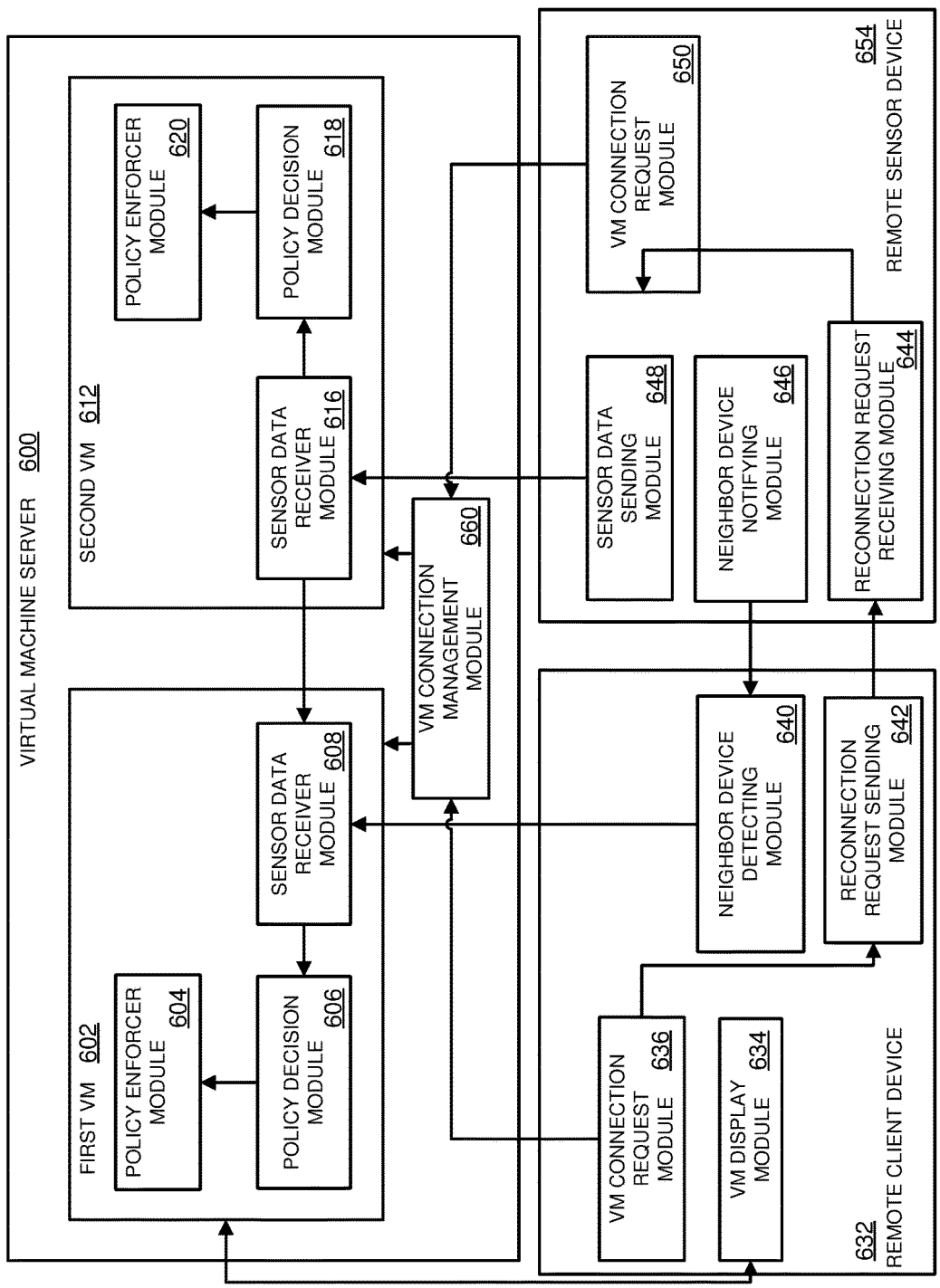
FIG. 6 illustrates a module-level block diagram of an example of a remote client device gaining access to a first VM hosted on a VM server by using a remote sensor device that has access to a second VM hosted on the VM server, according to various embodiments.

Now turning to FIG. 6, shown is a module-level block diagram of an example of a remote client device 632 gaining access to a first VM 602 hosted on a VM server 600 by using a remote sensor device 654 that has access to a second VM 612 hosted on the VM server 600, according to various embodiments. In some embodiments, the remote client device 632 may send an electronic request via a VM connection request module 636 to a VM connection management module 660. The electronic request may include a request for permission to utilize features of the first VM 602. The VM connection management module 660 may forward the electronic request to the first VM 602. The first VM 602 may determine that the remote client device 632 does not include one or more sensors and may inform the remote client device 632 accordingly. In some embodiments, when the first VM 602 denies the remote client device 632 access, a reconnection request sending module 642 may then identify a remote sensor device 654 and then transmit an electronic signal to the reconnection request receiving module 644 of the remote sensor device 654.

In some embodiments, the reconnection request receiving module 644 may then transmit an electrical signal to a VM connection request module 650 in order to attempt to access the VM server 600 on behalf of the remote client device 632. The VM connection management module 660 may receive this request in the form of an electrical signal from the VM connection request module 650. The VM connection management module 660 may identify a VM that is not being utilized, e.g., second VM 612. In some embodiments, a pseudo VM, e.g. pseudo VM 230 of FIG. 2 or a connection broker, e.g. connection broker 530 of FIG. 5, may also be identified by the VM connection management module 660 in addition to or instead of the second VM 612. The VM connection management module 660 may then transmit an electrical signal to the second virtual machine 612; the electrical signal may indicate that sensor data may soon be sent by the remote sensor device 654, and so second virtual machine 612 can be on stand by for the sensor data.

In some embodiments, the sensor data sending module 648 may then collect sensor data that includes such information about the remote client device 632 that satisfies security requirements that the remote client device 632 could not previously satisfy (e.g., acceleration and geographic location data). The sensor data may be verified by the sensor data sending module 648, then the verification may be sent electronically through the second virtual machine 612 to the first virtual machine 602. In some embodiments, the sensor data sending module 648 may encrypt the sensor data. The sensor data sending module 648 may also send the sensor data to the sensor data receiver module 616. The sensor data receiver module 616 may decrypt the sensor data. Once the sensor data receiver module 616 decrypts the sensor data, the sensor data may be transmitted to a policy decision module 618. The policy decision module 618 may determine that the sensor data satisfies at least a portion of a set of security criteria. In some embodiments, the policy decision module 618 may send the determination to a policy enforcer module 620 in the form of an electrical signal. The policy decision module 618 may determine which of the one or more features that are included within the first VM 602 that the remote client device 632 will be enabled to utilize. The policy enforcer module 620 may then analyze the sensor data to determine which VM the remote client device 632 was attempting to access. The policy enforcer module 620 may encrypt the determination and identify the first virtual machine 602 that the remote client device was attempting to access. In some embodiments, the policy enforcer module 620 may then send the determination back through the policy decision module 618 and the sensor data receiver module 616 to a sensor data receiver module 608.

In some embodiments, the sensor data receiver module 608 may decrypt the verification, then transmit the decrypted verification to the policy decision module 606. The policy decision module 606 can analyze the decrypted verification. The policy decision module 606 can determine which features of the first VM 602 are to be utilized by the remote client device 632. The policy decision module 606 may also unlock the features to be utilized by the remote client device 632. The policy decision module 606 may then transmit the verification to the policy enforcer module 604. The police enforcer module 604 may analyze the decrypted verification. In some embodiments, the policy enforcer module 604 may then regulate the features to be utilized by the remote client device 632 and may monitor activity of the first virtual machine 602 as utilized by the remote client device 632. In some embodiments, an interactive user interface, virtual machine display module 634, may receive a display of the utilizable features of the first virtual machine 602 from the first virtual machine 602 in the form of an electrical signal. The virtual machine display module 634 may also transmit an input, by a user, to the first virtual machine 602.

In some embodiments, rather than transmitting the sensor data through the second virtual machine 612, the remote sensor device 654 can verify the sensor data. The remote sensor device 654 may send the verification, encrypted or not encrypted, to the sensor data receiving module 608 by a neighbor device notifying module 646, through a neighbor device detecting module 640 of the remote client device 632. The neighbor device detecting module 640 may secure the encrypted verification or encrypted sensor data, then send the encrypted verification or encrypted sensor data to the sensor data receiver module 608. The functionality and modules described herein do not exhaust the functionalities of the VM server 600.

In some embodiments, dedicated sensor location information, e.g., geographic location of a remote client device relative to a remote sensor device, may be registered in advance of a request for VM access by a remote client device. This can be the case, for example, when the remote sensor device is placed in a moving object like a train and a bus and the remote client device is also on the moving object.

In some embodiments, a first client device which does not satisfy connection requirements (e.g., security criteria) due to a lack of mandatory sensing devices, may be allowed to connect to a VM server under the condition that a second remote client device that does satisfy the connection requirements is located within a predetermined proximity of the remote client device. In some embodiments, this may be achieved by sharing sensor data sent from the second remote client device to a VM hosted by the VM server. This may help to securely control the environment in which the first remote client device is utilized.

In some embodiments, to decrease the likelihood of fraudulent use by unauthorized users, a VM server connection may be disconnected (or various features of a VM may be disabled) when the predetermined proximity between the first remote client device and the second remote client device exceeds a certain threshold value, e.g., twenty feet. Alternatively, in some embodiments, a VM server session for connecting to the second remote client device can be established by providing a pseudo VM, rather than a VM, that may not be used for conducting any additional operations. In some embodiments, the second remote client device may be a location-fixed device shared by multiple users and/or a dedicated sensor device such as a surveillance camera, a Wi-Fi access point, or another special-purpose sensor.

Figure 7:
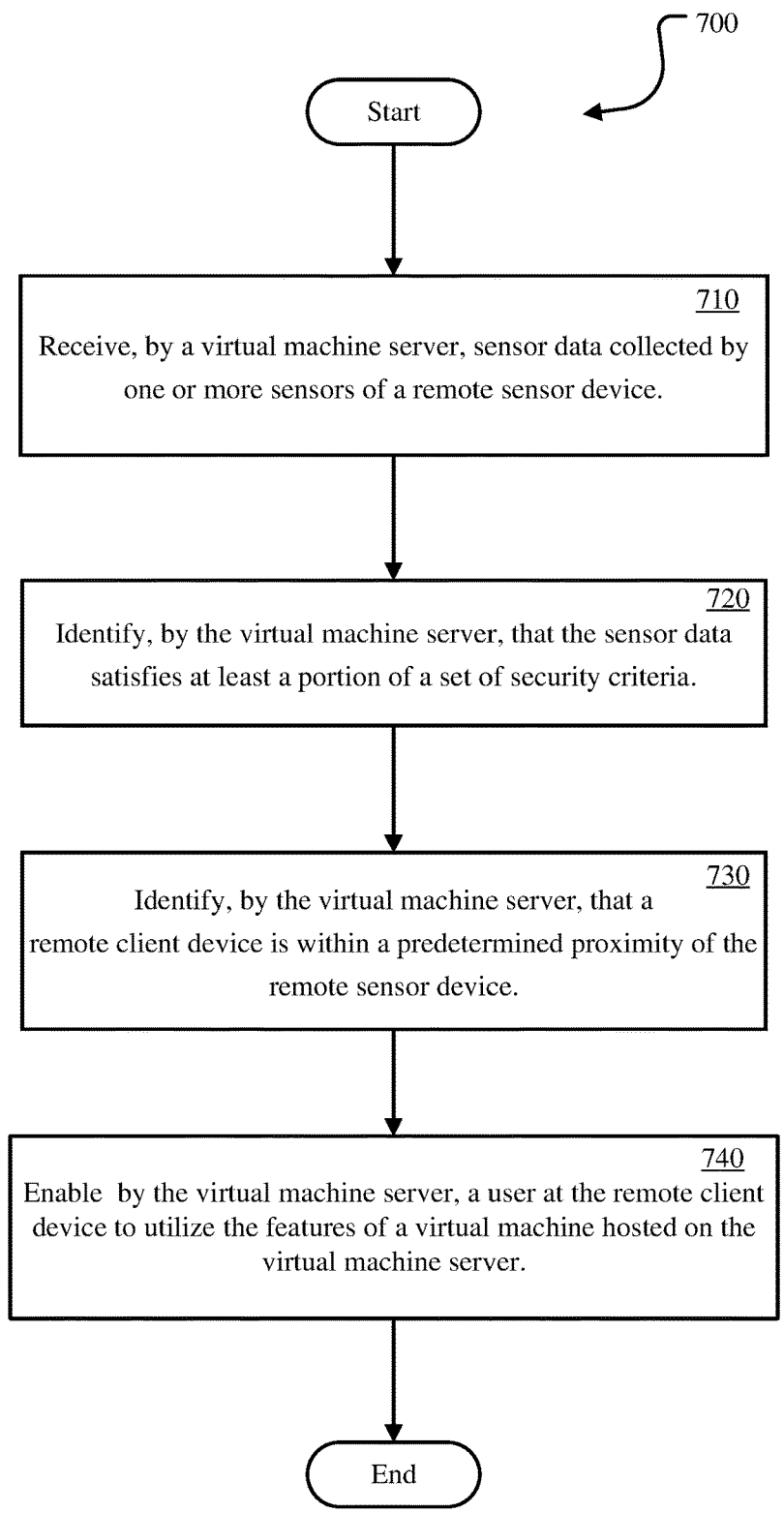
FIG. 7 illustrates a flowchart of a method for enabling a remote client device to gain access to features of a VM hosted on a VM server, according to various embodiments.

Turning now to FIG. 7, shown is a flowchart of a method for enabling a remote client device to gain access to features of a VM hosted on a VM server, according to various embodiments. In some embodiments, operation 710 can include a VM server receiving sensor data collected by one or more sensors of a remote sensor device. The sensor data can be information about the internal and external state of the remote sensor device, which may in turn inform about the external state of one or more remote client devices within close proximity of the remote sensor device. For example, the external state can include environmental characteristics, such as, geographic location, digital images of a predetermined operating facility, and acceleration data. In some embodiments, the nearby remote client device may provide the virtual machine server with information about the internal state of that device (e.g., each remote device may effectively collect its own internal state data). In some embodiments, the VM server may host one or more VMs that each includes one or more features which a remote client device may be enabled to utilize.

The remote client device may be an electronic computing device, e.g., a smart phone, laptop, or tablet. In some embodiments, the remote sensor device may be an electronic device that includes one or more sensors. The one or more sensors may include, for example, an accelerometer, GPS, and camera. In some embodiments, once the collected sensor data is received by the VM server, the operation 710 may proceed to an operation 720.

In some embodiments, operation 720 may include the VM server identifying that the sensor data satisfies at least a portion of the set of security criteria. The set of security criteria can include minimal acceptable attributes of the remote client device, e.g., operating system and hardware. The set of security criteria may also include minimum requirements for the sensor data including information collected by camera, GPS, and an accelerometer. For example, the sensor data could satisfy a portion of the security criteria when the sensor data includes images, acceleration, and geographic location. In some embodiments, a remainder of the security criteria may be satisfied by the remote client device itself without needing to utilize the sensors of the remote sensor device. In some embodiments, identifying that sensor data satisfies security criteria may include the VM server verifying this information itself or it may include the VM relying on another device (e.g., the remote sensor device) to perform the verification. In some embodiments, the operation 720 can proceed to an operation 730 once the sensor data has been identified to satisfy a portion of the set of security requirements.

In some embodiments, operation 730 may include the VM server identifying that the remote client device is within a predetermined proximity of the remote sensor device. In some embodiments, the sensor data received from the remote sensor device may also include data about the proximity of the remote client device in relation to the remote sensor device. The proximity can be defined to be, e.g., within a building, twenty feet, and a distance less than the maximum range of the connection between both of the devices. In some embodiments, identifying that remote client device is within the predetermined proximity of the remote sensor device may include the VM server verifying this information itself or it may include the VM relying on another device (e.g., the remote sensor device) to perform the verification. In some embodiments, once the operation 730 has identified that the remote client device is within the predetermined proximity of the remote sensor device, the method 700 can proceed to an operation 740.

In some embodiments, the operation 740 can include enabling a user at the remote client device to utilize the features of a VM hosted on the VM server. In some embodiments, the features can be restricted and monitored by the VM server and VM based on the portion of the set of security criteria that is satisfied. For example, when only geographic location is included in the sensor data, less than all of the features may be enabled for the remote client device to utilize. As another example, if only the acceleration data is included in the sensor data, some other of the features may be enabled for the remote device to utilize. In some embodiments, once the user is enabled to utilize features of the VM, the method 700 may conclude.

Figure 8:
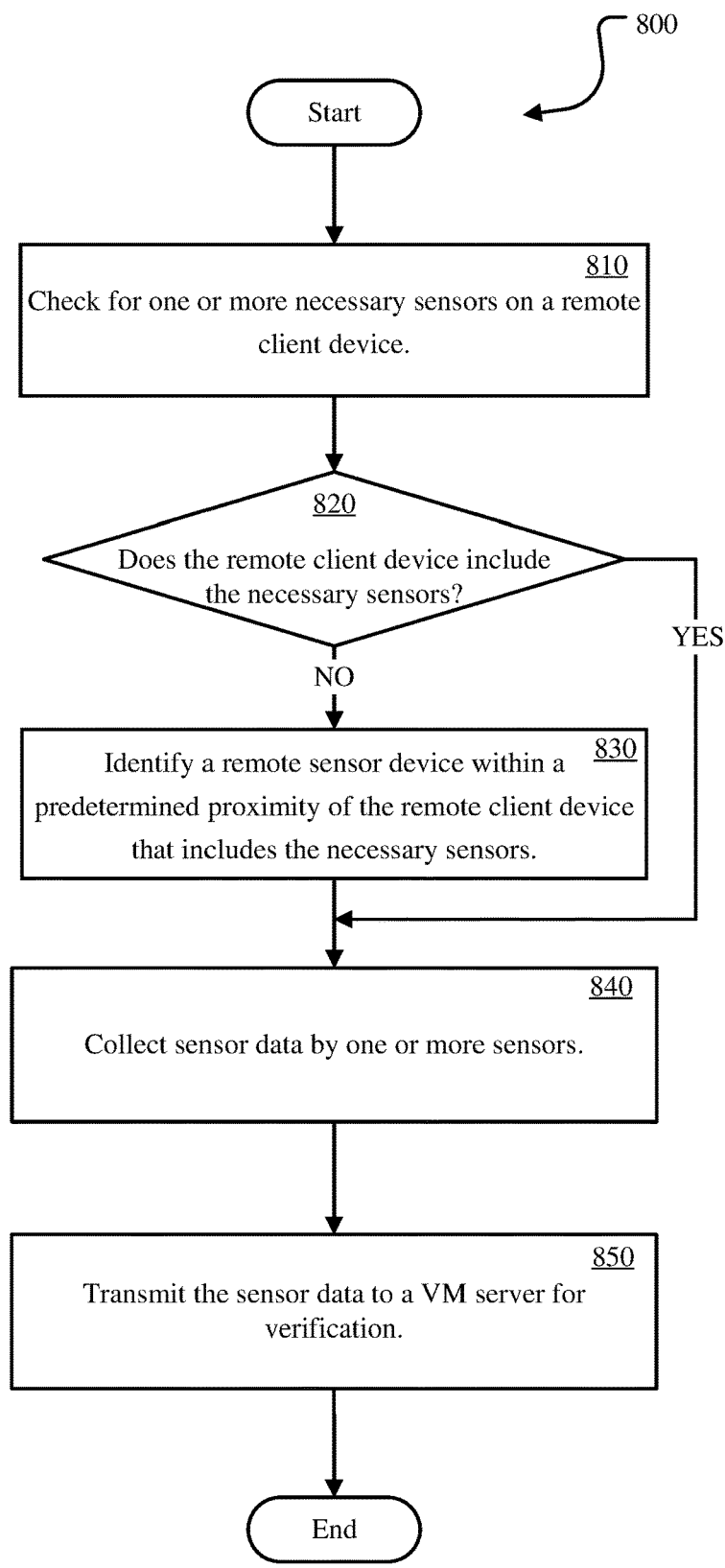
FIG. 8 illustrates a flowchart for a method for a remote client device to use a remote sensor device to satisfy a set of security criteria, according to various embodiments.

In some embodiments, a remote client device may be denied access, by a VM server, to utilize the features of the VM server. This may be due to the remote client device lacking one or more sensors. In some such embodiments, the remote client device may resolve this issue by identifying a remote sensor device within a predetermined proximity. Turning now to FIG. 8, shown is a flowchart for a method for a remote client device to use a remote sensor device to satisfy a set of security criteria, according to various embodiments. In some embodiments, operation 810 may include a VM server (or a remote client device) checking to determine if one or more required sensors are included in the remote client device. This may occur, for example, in response to the remote client device attempting to utilize features of a VM being hosted on the VM server. The remote sensors may include, for example, a camera, GPS, accelerometer, etc. The remote sensors may be required for security purposes. In some embodiments, once operation 810 checks for remote sensors, the method 800 may proceed to decision block 820.

In some embodiments, decision block 820 may include verifying that the remote client device includes the necessary sensors. The necessary sensors may include, for example, the GPS and camera. In some embodiments, a sensor may only qualify as one of the necessary sensors if the sensor is of a type or model trusted by the VM server. In some embodiments, when the remote client device includes the necessary sensors, the method may proceed to an operation 840. In some embodiments, when the remote client device does not include the necessary sensors, the method may proceed to operation 830.

In some embodiments, operation 830 may include identifying a remote sensor device within a predetermined proximity of the remote client device that includes the necessary sensors that are lacking in the remote client device. In some embodiments, the predetermined proximity may be, e.g., within a building, twenty feet, or a distance less than the maximum range of a connection between the devices. The remote sensor device may be, e.g., a laptop or smartphone. The remote sensor device may also be a dedicated sensor device, e.g., a GPS or digital surveillance camera. In some embodiments, the VM server may respond to a determination that the remote client device does not have the necessary sensors by notifying the remote client device (or a user thereon) that one or more remote sensor devices are nearby that are configured to provide the necessary sensor data. In some embodiments, once the remote sensing device is identified by the remote client device (or the VM server) at operation 830, the method may proceed to an operation 840.

In some embodiments, operation 840 may include collecting sensor data by the necessary sensors. The sensor data may be collected in whole by sensors included in the remote sensing device. The sensor data may be in part collected by sensors of the remote client device and in part by sensors of the remote sensor device. For example, image data and acceleration data may be collected by sensors of the remote client device, and geographic location data of the remote client device in relation to the remote sensor device may be collected by sensors of the remote sensor device. In some embodiments, once the sensor data is collected in operation 840, the method 800 can proceed to an operation 850.

In some embodiments, operation 850 may include transmitting the sensor data to a VM server for verification. In some embodiments, the transmission may occur by the remote sensor device sending the sensor data to the VM server. In some embodiments, the transmission may occur by the remote sensor device sending the sensor data through the remote client device to the VM server. The remote client device may encrypt the sensor data when the sensor data is sent through the remote client device to the VM server. In some embodiments, part of the sensor data may be sent from the remote sensor device and part of the sensor data may be sent from the remote client device. In some embodiments, once the sensor data is sent to the VM server in operation 850, the method 800 may conclude.

Figure 9:
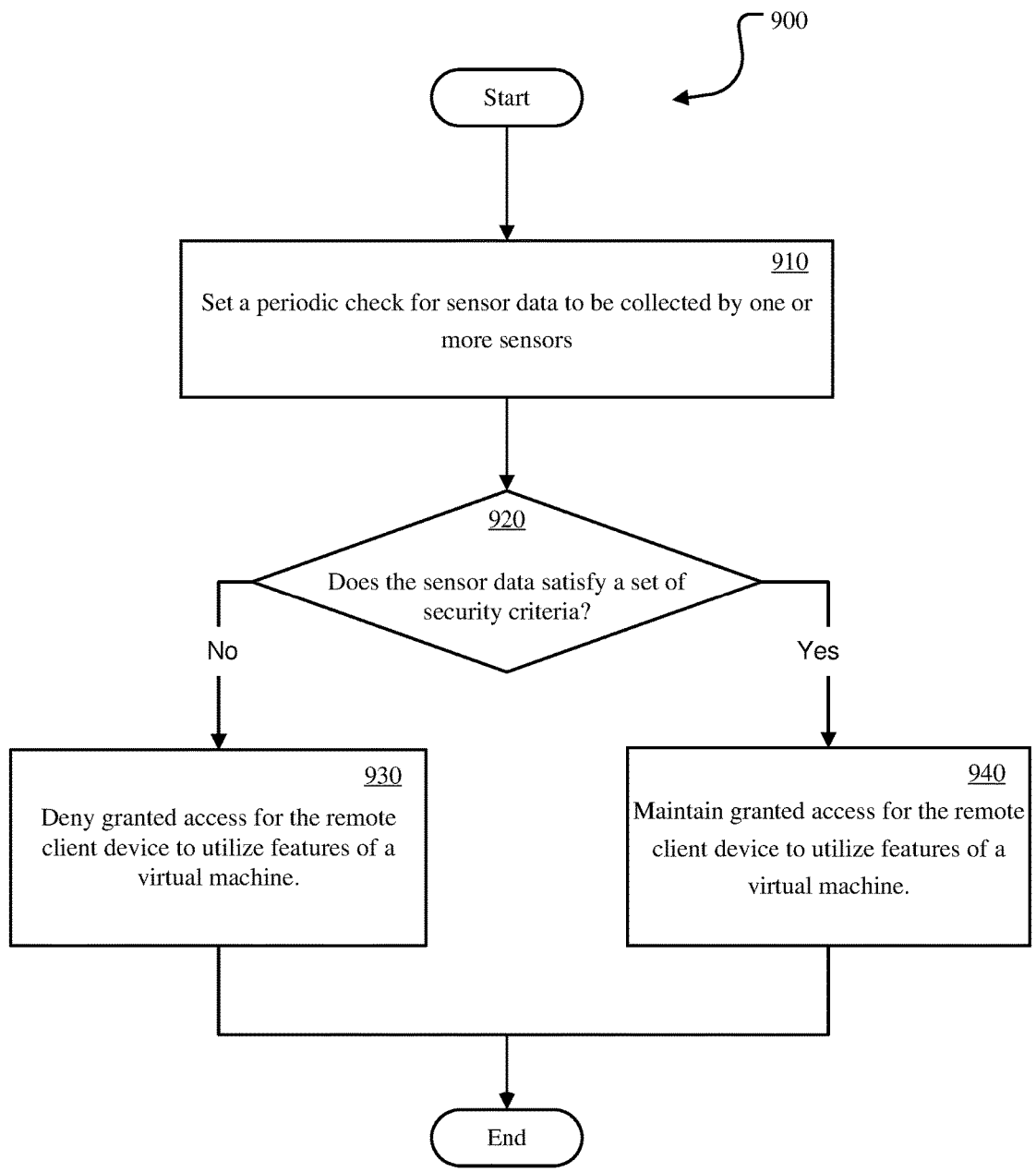
FIG. 9 illustrates a flowchart for a method for a VM server to periodically verify that a host device should be continued to be allowed access to features of a VM hosted on the VM server, according to various embodiments.

Now turning to FIG. 9, shown is a flowchart for a method for a VM server to periodically verify that a host device should be continued to be allowed access to features of a VM hosted on the VM server, according to various embodiments. In some embodiments, operation 910 may include setting a periodic check for sensor data to be collected by one or more sensors. The periodic check may be set for every five minutes, ten minutes, etc. The sensor data may be collected by one or more sensors included in a remote client device and by one or more sensors included in a remote sensor device which the remote client device is using to satisfy security criteria. In some embodiments, once the periodic check has been set in operation 910, the method 900 may proceed to a decision block 920.

In some embodiments, decision block 920 may include determining that whether sensor data satisfies a set of security criteria. The set of security criteria may relate to attributes of the remote client device, e.g., operating system and hardware. The set of security criteria may also relate environmental attributes surrounding the remote client device including information collected by camera, GPS, and an accelerometer. In some embodiments, a remote client device may attempt to satisfy a first portion of the security criteria using its own sensors and a second portion of the security criteria using sensors of a remote sensor device.

In some embodiments, when the sensor data does not satisfy the set of security criteria, the method 900 may proceed to an operation 930. In some embodiments, operation 930 may include denying (revoking, disabling, etc.) access for the remote client device to utilize features of a virtual machine hosted on the VM server. In some embodiments, when the sensor data satisfies the set of security criteria, the method 900 may proceed to an operation 940. In some embodiments, operation 940 may include maintaining granted access for the remote client device to utilize features of the virtual machine. In some embodiments, once operation 930 or operation 940 has revoked or maintained previously granted access for the remote client device to utilize features of the VM, the method 900 may conclude.

In some embodiments, a remote client device may be allowed to access to a VM server, even when the remote client device does not satisfy connection requirements. This may be under the condition that a second remote client device that satisfies a set of security criteria exists within a predetermined proximity of the first remote client device. For example, in one scenario, a first remote client device (e.g., a desktop PC) does not satisfy a set of security criteria. The remote client device lacks one or more mandatory sensor devices such as GPS, camera, and acceleration sensors, but the remote client device has a large-size monitor and an easy-to-use mouse and keyboard. Continuing the scenario, a second remote client device (e.g., a tablet or smartphone) is able to satisfy the set of security criteria and is equipped with all mandatory sensor devices (e.g., camera, GPS, accelerometer). However, the usability of the second remote client device is relatively poor because it has a small screen and a touch panel. The second remote client device can connect to the VM server because it satisfies the set of security criteria. On the other hand, the first remote client device can be rejected from accessing the VM server (or VMs thereon) due to a lack of a mandatory sensing devices. The first remote client device then tries to connect to the VM server and satisfy the set of security requirements with the help of the second remote client device as follows: the first client device detects that the second remote client device, which has already established a connection to the VM server, is nearby; the first remote client device requests the second remote client device to send a connection re-request on behalf of the first remote client device; the second remote client device sends the connection re-request with sensor data on behalf of the remote client device; and the VM server allows for the first remote client device to connect under a condition that the first remote client device and the second remote client device remain located within a same place, or within a predetermined proximity.

Continuing the scenario, after connecting the first remote client device to the VM server, a virtual desktop (of a VM hosted on the VM server) is enabled for the first remote client device. While the first remote client device is connected, the VM server periodically checks whether the first remote client device and the second remote client device are within the predetermined proximity. The VM server also periodically checks whether sensor data received from the second remote client device continues to satisfy the set of security criteria. Once the predetermined proximity exceeds a certain threshold value, e.g. twenty feet, or once the sensor data fails the set of security criteria, the VM server disables the first remote client device from using the virtual desktop. In some embodiments, when a necessary sensor on the first remote client device is broken or disabled by, e.g., a company rule that prohibits use of unauthorized devices in a designated area, sensor data from the second remote client device, which is an authorized device, may be used for supporting the first client device's connection.

Figure 10:
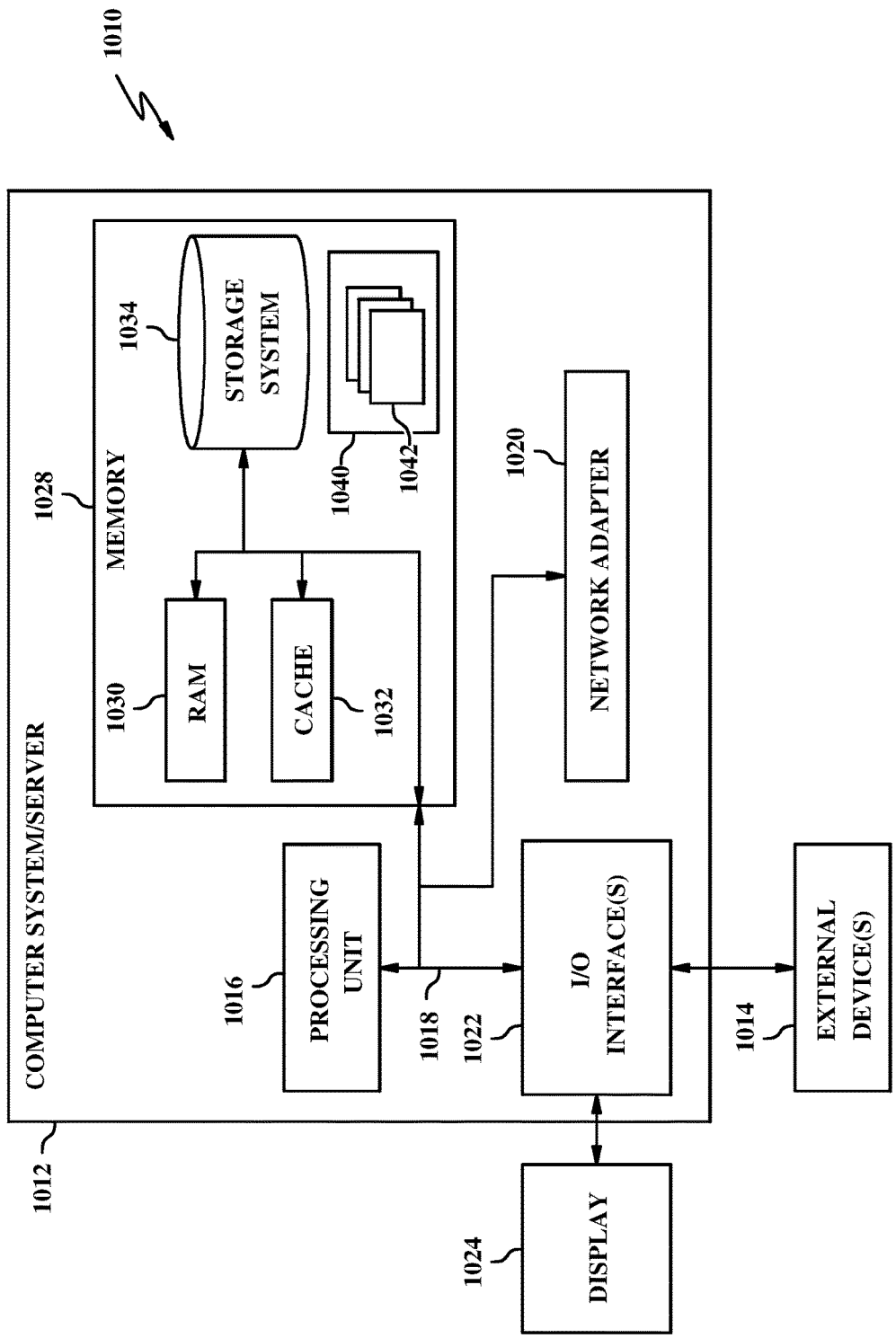
FIG. 10 illustrates a block diagram of an example computer system that can perform one or more methods of the present disclosure, according to various embodiments.

In some embodiments, the operations and modules described herein can be included within and performed by components of a computer (e.g., a processor), such as the computer system described in FIG. 10.

FIG. 10 depicts a high-level block diagram of a system for implementing embodiments of the disclosure. As shown in FIG. 10, computer system/server 1012 in computing node 1010 is shown in the form of a general-purpose computing device. The components of computer system/server 1012 may include, but are not limited to, one or more processors or processing units 1016, a system memory 1028, and a bus 1018 that couples various system components including system memory 1028 to processor 1016.

Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1012 typically includes a variety of computer system readable media. Such media may be any available media that is accessible by computer system/server 1012, and it includes both volatile and non-volatile media, removable and non-removable media.

System memory 1028 can include computer system readable media in the form of volatile memory, such as random access memory (RAM) 1030 and/or cache memory 1032. Computer system/server 1012 may further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, memory 1028 may include at least one program product having a set (e.g., at least one) of program modules that are configured to carry out the functions of embodiments of the invention.

Program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer system/server 1012 may also communicate with one or more external devices 1014 such as a keyboard, a pointing device, a display 1024, etc.; one or more devices that enable a user to interact with computer system/server 1012; and/or any devices (e.g., network card, modem, etc.) that enable computer system/server 1012 to communicate with one or more other computing devices. Such communication can occur via Input/Output (I/O) interfaces 1022. Still yet, computer system/server 1012 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for using a virtual machine server to enforce a set of security criteria upon a remote client device, the virtual machine server configured to host a virtual machine having features utilizable by a user at the remote client device, the method comprising:
    receiving, by the virtual machine server, sensor data collected by one or more sensors of a remote sensor device, wherein the remote sensor device is a second remote client device;
    identifying, by the virtual machine server, that the sensor data satisfies at least a subset of the set of security criteria;
    enabling by the virtual machine server, and based on the sensor data satisfying the at least a subset of the set of security criteria, a second user at the second remote client device to utilize features of a second virtual machine hosted on the virtual machine server;
    identifying, after enabling the second user at the second remote client device, and by the virtual machine server, that the remote client device is within a predetermined proximity of the remote sensor device; and
    enabling, by the virtual machine server and based on the sensor data satisfying the at least the subset of the set of security criteria and further based on the remote client device being within the predetermined proximity of the remote sensor device, the user at the remote client device to utilize the features of the virtual machine hosted on the virtual machine server.

2. The method of claim 1, wherein the sensor data is received via a first connection between the remote sensor device and the virtual machine server, wherein the virtual machine is provided to the remote client device via a second connection between the remote client device and the virtual machine server, wherein the remote sensor device does not have access to data transmitted via the second connection, wherein the remote client device does not have access to data transmitted via the first connection, and wherein the remote sensor device is not physically attached to the remote client device.

3. The method of claim 1, wherein the virtual machine and the second virtual machine are a same virtual machine instance.

4. The method of claim 1, wherein the enabling the user at the remote client device to utilize the features of the virtual machine comprises:
    enabling the user to interact with a virtual desktop.

5. The method of claim 1, wherein the at least a subset of the security criteria is less than all of the security criteria, the method further comprising:
    identifying, by the virtual machine server, that internal configurations of the remote client device satisfy remaining elements of the set of security criteria that are not included in the subset of the security criteria,
    wherein the enabling the user at the remote client device to utilize the features of the virtual machine is further based on the remaining elements of the set of security criteria being satisfied.

6. The method of claim 1, wherein the sensor data comprises geography location information about a first location at which the remote sensor device is located, and wherein the one or more sensor comprises a GPS device.

7. The method of claim 1, wherein the sensor data comprises biometric information about the user, and wherein the one or more sensor comprises a biometric scanner.

8. The method of claim 1, further comprising:
    identifying, by the virtual machine server and after the enabling the user at the remote client device to utilize the features of the virtual machine, that the remote client device is no longer within the predetermined proximity of the remote sensor device; and disabling, by the virtual machine server and based on the remote client device no longer being within the predetermined proximity of the remote sensor device, the enabled features.

9. The method of claim 1, further comprising:

identifying, by the virtual machine server and after the enabling the user at the remote client device to utilize the features of the virtual machine, that the sensor data no longer satisfies the at least the subset of the set of security criteria; and disabling, by the virtual machine server and based on the sensor data no longer satisfying the at least the subset of the set of security criteria, the enabled features.

10. The method of claim 1, further comprising:

receiving, by the virtual machine server, a request to enable the user at the remote client device to utilize the features of the virtual machine;

identifying, by the virtual machine server and in response to the receiving the request, that the remote client device does not include a sensor configured to provide sensor data necessary to satisfy the at least the subset of the security criteria; and notifying, by the virtual machine server and in response to the identifying that the remote client device does not include the necessary sensor, the remote client device that the remote sensor device is within the predetermined proximity of the remote client device and that the remote sensor device is configured to provide the necessary sensor data, wherein the sensor data is received from the remote sensor device in response to the notification to the remote client device.

11. A system for using a virtual machine server to enforce a set of security criteria upon a remote client device, the virtual machine server configured to host a virtual machine having features utilizable by a user at the remote client device, the system comprising:

a processor; and a computer readable storage medium having program instructions embodied therewith, the program instructions executable by the processor to cause the system to:

receive, by the virtual machine server, sensor data collected by one or more sensors of a remote sensor device, wherein the remote sensor device is a second remote client device;

identify, by the virtual machine server, that the sensor data satisfies at least a subset of the set of security criteria;

enabling by the virtual machine server, and based on the sensor data satisfying the at least a subset of the set of security criteria, a second user at the second remote client device to utilize features of a second virtual machine hosted on the virtual machine server;

identify, after enabling the second user at the second remote client device, and by the virtual machine server, that the remote client device is within a predetermined proximity of the remote sensor device; and enabling, by the virtual machine server and based on the sensor data satisfying the at least the subset of the set of security criteria and further based on the remote client device being within the predetermined proximity of the remote sensor device, the user at the remote client device to utilize the features of the virtual machine hosted on the virtual machine server.

12. The system of claim 11, wherein the sensor data is received via a first connection between the remote sensor device and the virtual machine server, wherein the virtual machine is provided to the remote client device via a second connection between the remote client device and the virtual machine server, wherein the remote sensor device does not have access to data transmitted via the second connection, wherein the remote client device does not have access to data transmitted via the first connection, and wherein the remote sensor device is not physically attached to the remote client device.

13. The system of claim 11, wherein the virtual machine and the second virtual machine are a same virtual machine instance.

14. The system of claim 11, wherein the enabling the user at the remote client device to utilize the features of the virtual machine comprises:

enabling the user to interact with a virtual desktop.

15. A computer program product comprising a computer readable storage medium having program instructions embodied therewith, wherein the computer readable storage medium is non-transitory, the program instructions executable by a computer to perform a method for using a virtual machine server to enforce a set of security criteria upon a remote client device, the virtual machine server configured to host a virtual machine having features utilizable by a user at the remote client device, the method comprising:

receiving, by the virtual machine server, sensor data collected by one or more sensors of a remote sensor device, wherein the remote sensor device is a second remote client device;

identifying, by the virtual machine server, that the sensor data satisfies at least a subset of the set of security criteria;

enabling by the virtual machine server, and based on the sensor data satisfying the at least a subset of the set of security criteria, a second user at the second remote client device to utilize features of a second virtual machine hosted on the virtual machine server;

identifying, after enabling the second user at the second remote client device, and by the virtual machine server, that the remote client device is within a predetermined proximity of the remote sensor device; and enabling, by the virtual machine server and based on the sensor data satisfying the at least the subset of the set of security criteria and further based on the remote client device being within the predetermined proximity of the remote sensor device, the user at the remote client device to utilize the features of the virtual machine hosted on the virtual machine server.

16. The computer program product of claim 15, wherein the sensor data is received via a first connection between the remote sensor device and the virtual machine server, wherein the virtual machine is provided to the remote client device via a second connection between the remote client device and the virtual machine server, wherein the remote sensor device does not have access to data transmitted via the second connection, wherein the remote client device does not have access to data transmitted via the first connection, and wherein the remote sensor device is not physically attached to the remote client device.

17. The computer program product of claim 15, wherein the virtual machine and the second virtual machine are a same virtual machine instance.

* * * * *